United States Patent [19]

Niiyama et al.

[11] Patent Number: 5,193,417

[45] Date of Patent: Mar. 16, 1993

[54] TRANSMISSION WITH ONE-WAY CLUTCHES AND FAILSAFE METHOD OF AND APPARATUS FOR CONTROLLING THE TRANSMISSION

[75] Inventors: Tsunefumi Niiyama; Noboru Sekine, both of Saitama; Takamichi Shimada, Tokyo; Hiroyuki Shimada, Saitama; Kaoru Kajikawa, Tokyo, all of Japan

[73] Assignee: Honda Giken Kogyo Kabushiki Kaisha, Tokyo, Japan

[21] Appl. No.: 520,416

[22] Filed: May 8, 1990

[30] Foreign Application Priority Data

May 8, 1989 [JP] Japan .................. 1-114571
May 18, 1989 [JP] Japan .................. 1-124687
May 26, 1989 [JP] Japan .................. 1-133380

[51] Int. Cl.$^5$ .................. F16H 59/00; F16H 61/00
[52] U.S. Cl. .................. 74/866; 192/4 A; 364/424.1; 74/335
[58] Field of Search .................. 192/3.58, 4 A, 48.92; 74/866, 868, 335; 137/329

[56] References Cited

U.S. PATENT DOCUMENTS

| | | | |
|---|---|---|---|
| 2,838,059 | 6/1958 | Biagi et al. | 137/329 |
| 3,548,980 | 12/1970 | Schmidt | 192/4 A |
| 3,650,161 | 3/1972 | Ito et al. | 74/335 X |
| 3,756,358 | 9/1973 | Espenschied et al. | 192/4 A |
| 3,834,499 | 9/1974 | Candellero et al. | 192/3.58 X |
| 4,351,206 | 9/1982 | Lemieux et al. | 74/866 |
| 4,476,530 | 10/1984 | Pannier et al. | 74/866 |
| 4,616,521 | 10/1986 | Akashi et al. | 74/335 |
| 4,621,545 | 11/1986 | Mohl | 74/866 |
| 4,622,866 | 11/1986 | Ito et al. | 74/866 |
| 4,637,278 | 1/1987 | Nishikawa et al. | 74/866 |
| 4,662,488 | 5/1987 | Hiramatsu et al. | 192/3.58 |
| 4,680,992 | 7/1987 | Hayasaki et al. | 74/866 X |
| 4,700,819 | 10/1987 | Nishikawa et al. | 12/3.58 X |
| 4,860,607 | 8/1989 | Numazawa et al. | 192/3.58 X |
| 4,889,016 | 12/1989 | Kuwayama et al. | 64/868 |
| 4,995,285 | 2/1991 | Hayakawa et al. | 74/868 X |
| 5,083,481 | 1/1992 | Smith et al. | 74/866 X |

FOREIGN PATENT DOCUMENTS

52-21131 6/1977 Japan .
61-189354 8/1986 Japan .
61-233248 10/1986 Japan .
2-31050 2/1990 Japan .

*Primary Examiner*—Leslie A. Braun
*Assistant Examiner*—Khoi O. Ta
*Attorney, Agent, or Firm*—Lyon & Lyon

[57] ABSTRACT

A shift control apparatus controls the shifting of a transmission by selecting one power transmitting path at a time from a plurality of paths respectively having different speed reduction ratios. At least one power transmitting path is provided with a one-way clutch and an engine-brake clutch is included in the plurality of paths. The one-way clutch can be locked by the engine-brake clutch. An engine-brake clutch control valve is provided for controlling the engine-brake clutch. Two solenoid valves are provided for controlling the engine brake clutch control valve. When one of the two solenoid valves fails and is inactivated, the other solenoid valve is used to cause the engine-brake clutch control valve to engage the engine-brake clutch.

13 Claims, 9 Drawing Sheets

FIG. 5

| 1ST SOL 151 | 2ND SOL 152 | D RANGE | 3 RANGE | 2 RANGE | 1 RANGE | R RANGE |
|---|---|---|---|---|---|---|
| OFF | ON | LOW | LOW | (LOW) | (LOW) | — |
| ON | ON | 2ND | 2ND | (2ND) | (2ND) | (REV) |
| ON | OFF | (3RD) | (3RD) | (3RD) | (2ND) | (REV) |
| OFF | OFF | (4TH) | (3RD) | (2ND) | (2ND) | (REV) |
| SYSEM DOWN | | (4TH) | (3RD) | (2ND) | (2ND) | (REV) |

FIG. 7

| | | 3RD SOL 153 | | | | | |
|---|---|---|---|---|---|---|---|
| | | ON | | | OFF | | |
| D 3 | | L/C ON | | | L/C OFF | | |
| 2 1 | | 1ST SOL 151 | ON | E/B ON | 2ND SOL 151 | ON | E/B ON |
| | | | OFF | E/B OFF | | OFF | E/B ON |

FIG. 9 A SHIFT LEVER (MANUAL VALVE)
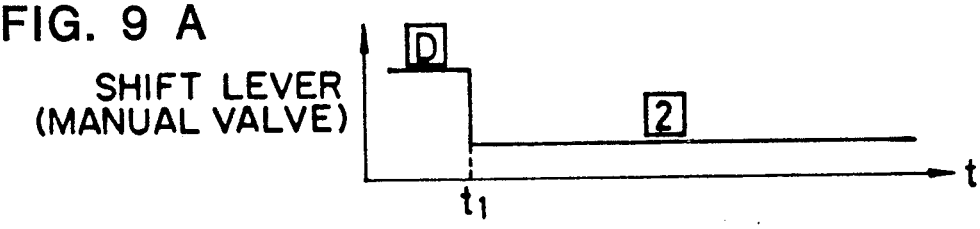
FIG. 9 B SHIFT SOLENOID OUTPUT
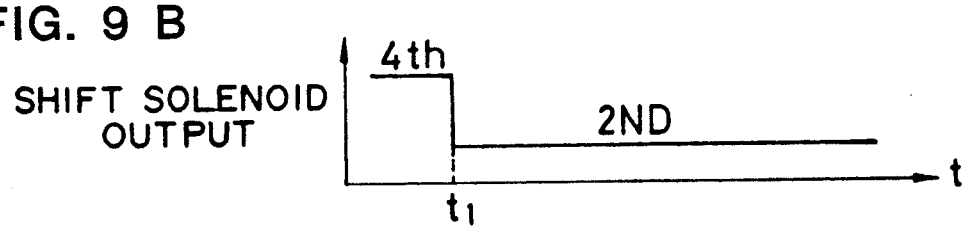
FIG. 9 C 3RD SOLENOID
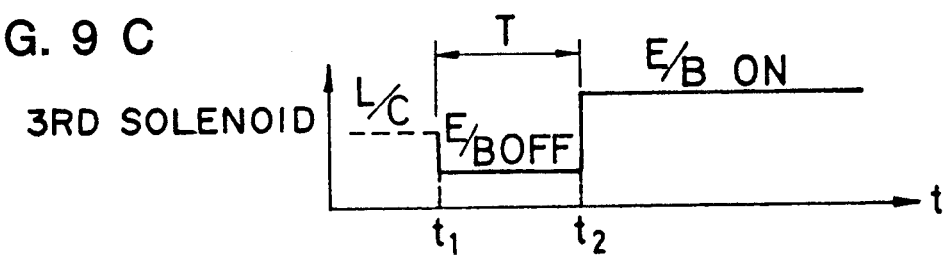
FIG. 9 D CLUTCH PRESSURE
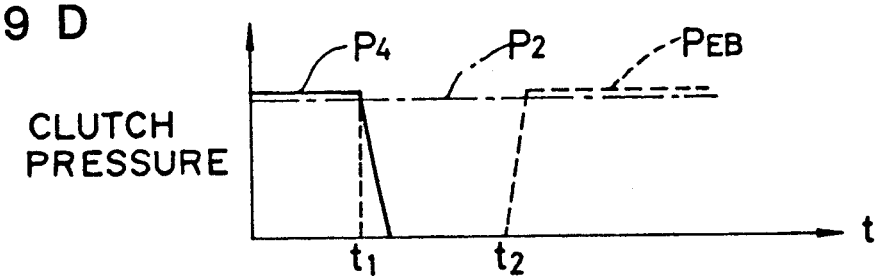
FIG. 9 E SPEED RATIO ($e_{CLa}$)
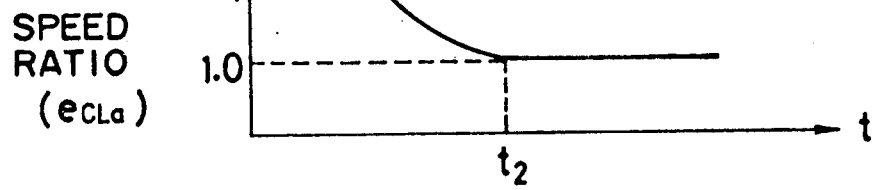

TRANSMISSION WITH ONE-WAY CLUTCHES AND FAILSAFE METHOD OF AND APPARATUS FOR CONTROLLING THE TRANSMISSION

BACKGROUND OF THE INVENTION

The present invention relates to a countershaft-type transmission having a plurality of parallel intermeshing gear trains on and between parallel shafts, the gear trains being selectable for different gear positions, and more particularly to such a transmission with one-way clutches associated respectively with two high-load gear trains. The present invention is also directed to a method of and an apparatus for controlling the operation of a transmission through the control of operation of clutches, and more particularly to a method of and an apparatus for controlling a transmission which has one-way clutches in a power transmitting path thereof and an engine-brake clutch for locking the one-way clutches.

Countershaft-type transmissions have parallel shafts supporting intermeshing gears which provide a plurality of parallel gear trains for the transmission of engine power. When one of the gear trains is selected for engine power transmission, the transmission sets up a corresponding gear position. Such countershaft-type transmissions are widely used as automotive transmissions. One example of countershaft-type transmission is disclosed in Japanese Laid-Open Patent Publication No. 61(1986)-233248, for example.

Some countershaft-type transmissions include one-way clutches combined with gear trains (especially, high-load gear trains), for allowing the engine power to be transmitted only in a direction to drive the automobile. Japanese Patent Application No. 63(1988)-180647, for example, shows a countershaft-type transmission wherein one-way clutches are associated respectively with two high-load gear trains.

However, use of such one-way clutches prevents engine brake from being applied when the engine power is to be transmitted in the direction opposite to the automobile driving direction because the one-way clutches would idly rotate and fail to transmit the engine power. One solution is to include an engine-brake clutch which directly couples the input and output members of a one-way clutch thereby to lock the one-way clutch, so that engine brake is available.

Transmissions with engine-brake clutches tend to be long in the axial direction since they require a space for the installation of the engine-brake clutch in combination with the one-way clutches. In the transmission disclosed in Japanese Patent Application No. 63(1988)-180647, particularly, two one-way clutches are disposed in series with each other, and their operation is controlled by a single engine-brake clutch. It is necessary to couple the input member of one of the one-way clutches to the output member of the other one-way clutch. The gear trains, clutches for selecting the gear trains, and members by which the input and output members of the one-way clutches are arranged such that the transmission is necessarily large in size.

The layout of the above transmission components should preferably be designed to position the high-load gear trains at an end of the axial span or length of the transmission thereby minimizing any bending moment on the shafts and any flexing of the shafts. Moreover, the two high-load gear trains combined with the one-way clutches should be located as close to each other as possible thus allowing the one-way clutches to be easily coupled to each other.

Countershaft-type transmissions are often used as automatic transmissions. In countershaft-type automatic transmissions, one-way clutches are also combined with gear trains for allowing the engine power to be transmitted only in a direction to drive the automobile. Since such a one-way clutch prevents engine brake from being applied, an engine-brake clutch is also disposed parallel to the one-way clutch. To apply engine brake, the engine-brake clutch is engaged to lock the one-way clutch.

Automatic transmissions on automobiles are operated to automatically select gear positions depending on the running conditions of the automobiles. One automatic transmission is disclosed in Japanese Patent Publication No. 52(1977)-21131. An example of the process of controlling an automatic transmission is shown in Japanese Laid-Open Patent Publication No. 61(1986)-189354.

Generally, an automatic transmission comprises a fluid-operated power transmission mechanism such as a torque converter and a plurality of power transmitting paths such as gear trains which are coupled to the output shaft of the power transmission mechanism. The transmission can be shifted to any of various gear positions when a corresponding one of the power transmitting paths is selected. According to one generally known arrangement, selection of the power transmitting paths is carried out by shift control valves which control the operation of hydraulically-operated clutches (shift means) in the respective power transmitting paths.

As is well known in the art, the shift control valves and a control valve for controlling an engine-brake clutch are controlled in operation by solenoid valves because complex operation of these control valves can accurately be controlled through electric control of the solenoid valves. However, if the solenoid valves fail, then the control of the control valves will become inaccurate. Failures of the solenoid valves include breakage of wires and short circuits. It is empirically found out that solenoid valve short circuits are less probable, and measures against wire breakage should preferably be taken in advance.

The automatic transmission operates selectively in shift control modes in which engine brake is needed and shift control modes in which no engine brake is needed. Under certain conditions, the engine-brake clutch is engaged to apply engine brake, and under other conditions, the engine-brake clutch is disengaged.

Heretofore, those conditions for engaging and disengaging the engine-brake clutch are uniquely set up for corresponding shift ranges (e.g., D, 2, 1 ranges) which are selected by manual valves operated by the shift lever of the transmission. More specifically, for the D range, a power transmitting path with a one-way clutch is set up with the engine-brake clutch disengaged to apply no engine brake. For the 2 and 1 ranges, a power transmitting path is set up with the engine-brake clutch engaged to apply engine brake.

When the shift lever is operated to shift the transmission from the D range to the 2 or 1 range, for example, making a downshift while the accelerator pedal is being depressed (power-on mode), the input and output members of the shift clutch are synchronized, and then the engine power starts being transmitted through the one-way clutch. Therefore, the transmission can smoothly be shifted. However, as described above, the engine-brake clutch is engaged or disengaged depending on the shift range selected by the shift lever. The transmission is shifted from the D range to the 2 or 1 range while the engine-brake clutch is being engaged. Consequently, the engine-brake clutch is engaged before the input and output members of the shift clutch are synchronized, resulting in a shift shock which leads to jerky shifting operation.

One conventional solution has been to employ an accumulator disposed in an oil passage which supplies working oil to the engine-brake clutch, so that the engine-brake clutch will not abruptly be engaged, thereby reducing any shift shock. With this arrangement, however, a control valve requires the incorporation of an accumulator, and is complex and large in size.

SUMMARY OF THE INVENTION

It is an object of the present invention to provide a transmission which has high-load gear trains positioned near a shaft bearing region so that any bending moment acting on a shaft and flexing of the shaft will be reduced.

Another object of the present invention is to provide a transmission which has high-load gear trains combined with respective one-way clutches, the gear trains being positioned as close to each other as possible for easy coupling of the one-way clutches to each other.

Still another object of the present invention is to provide a transmission with one-way clutches, which includes gear trains and clutches that are positioned in an optimum layout, rendering the transmission lightweight and compact.

Yet another object of the present invention is to provide a transmission controlling apparatus which can control a transmission reliably even when solenoid valves for controlling shift control valves and an engine-brake clutch are de-energized due to wire breakage or the like.

A further object of the present invention is to provide a transmission controlling method capable of smoothly shifting a transmission, without a shift shock, to a gear position which employs a power transmission path with an engine-brake clutch engaged, and also to provide a transmission controlling apparatus which can carry out such a transmission controlling method.

According to the present invention, there is provided a countershaft-type transmission comprising two parallel rotatable shafts, two bearings by which the shafts are rotatably supported, a plurality of parallel gear trains disposed on and between the two rotatable shafts, for transmitting power between the rotatable shafts, the gear trains including two high-load gear trains to which higher loads are imposed, and two one-way clutches disposed respectively in the two high-load gear trains, for allowing power from an engine to be transmitted only in a driving direction, the two high-load gear trains being disposed one on each side of the bearings, each of the one-way clutches having an input member and an output member, the output member of one of the one-way clutches being coupled to the input member of the other of the one-way clutches through a connector assembly which is disposed in a radially inner portion of one of the bearings.

According to the present invention, there is also provided a countershaft-type transmission comprising an input shaft, a countershaft parallel to the input shaft, two bearings by which the input shaft and the countershafts are rotatably supported, a plurality of parallel gear trains disposed on and between the input shaft and the countershaft, for transmitting power between the input shaft and the countershaft, the gear trains including two high-load gear trains to which higher loads are imposed, two one-way clutches disposed respectively in the two high-load gear trains, for allowing power from an engine to be transmitted only in a driving direction, the two high-load gear trains being disposed one on each side of the bearings, the gear trains including a third high-load gear train to which a higher load is imposed, the third high-load gear train being disposed near an end of the transmission, and clutch means disposed on the countershaft, for selecting the third high-load gear train.

According to the present invention, there is further provided an apparatus for controlling shifting operation of a transmission for selecting one, at a time, of a plurality of power transmitting paths having different speed reduction ratios, the power transmitting paths including at least one power transmitting path which has a one-way clutch for transmitting power only in a driving direction and an engine-brake clutch for locking the one-way clutch, the apparatus comprising an engine-brake clutch control valve for controlling the engine-brake clutch, and two solenoid valves for controlling the engine-brake clutch control valve, the arrangement being such that, when one of the two solenoid valves fails and is inactivated, the other solenoid valve is used to cause the engine-brake clutch control valve to engage the engine-brake clutch.

Even if one of the two solenoid valves which control operation of the engine-brake clutch control valve fails and is inactivated, the engine-brake clutch control valve can be activated to engage the engine-brake clutch, thus always setting up a power transmitting path with engine brake available. An automobile on which the transmission is mounted is therefore rendered safe while it is running. The transmission controlling apparatus of the present invention provides a reliable fail-safe function against failures of the solenoid valves.

Furthermore, there is provided in accordance with the present invention an apparatus for controlling shifting operation of a transmission having a plurality of power transmitting paths having different speed reduction ratios, a shift control valve for selecting one, at a time, of the power transmitting paths, two solenoid valves for controlling the shift control valve, and a manual valve for selecting a desired one of a plurality of ranges in response to operation by a driver, the apparatus comprising first means for allowing shifts to be made between all or selected ones of the power transmitting paths in the respective ranges, the power transmitting paths in the respective ranges being set up depending on combinations of activation and inactivation of the two solenoid valves and second means for setting up one of the power transmitting paths which has a smallest speed reduction ration, i.e., which provides a highest gear position, when both the solenoid valves fail and are inactivated.

If both the two solenoid valves which control operation of the shift control valve fail and are inactivated due to a failure of an electronic control system of the apparatus, for example, the power transmitting path for the highest gear position in each of the ranges is set up. Therefore, a lower gear position is prevented from being selected and a large engine brake force is prevented from being produced upon such a system failure. If the ranges have different highest gear positions, then in the event of a failure of both the solenoid valves, a shift lever may be operated on to actuate a manual valve for changing ranges to set up different gear positions, i.e., a manual shifting operation may be performed.

According to the present invention, furthermore, when a shift is to be made from any of the power transmitting paths to the one power transmitting path with the one-way clutch in which the engine-brake clutch is operable, the engine-brake clutch is disengaged until the rotational speeds of input and output members of shifting means for shifting the one power transmitting path with the one-way clutch are synchronized, after the shift has started, and after the rotational speeds are synchronized, the engine-brake clutch is engaged.

An apparatus for effecting such shift control includes a control solenoid valve for generating second control hydraulic pressure, and the engine-brake clutch is controlled with the control hydraulic pressure generated by the control solenoid valve. The control solenoid valve may comprises a solenoid valve whose duty ratio is controllable, or a solenoid valve which can selectively be activated and inactivated.

According to the above apparatus, when the shift lever is operated on while the accelerator pedal is being depressed (power-on mode) to effect a downshift to a gear position (power transmitting path) in which engine brake is available, the engine-brake clutch is disengaged (OFF) and the transmission is shifted to the gear position through the one-way clutch until the rotational speeds of the input and output members of a shifting means (e.g., a shifting clutch) for setting up the gear position are synchronized after the starting of the shifting operation. When the rotational speeds are synchronized thereafter, the engine-brake clutch is engaged to set up the gear position in which engine brake is available. The shifting operation is therefore effected smoothly through the one-way clutch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 5 is a table showing the relationship between operation of first and second solenoid valves, manual valve positions, and gear positions;

FIG. 7 a showing the relationship between operation of first and third solenoid valves and operation of an engine-brake clutch and a lockup mechanism;

FIG. 9 (A–E) is a set of graphs showing shift command signals, clutch pressure, and clutch input/output rotational speed ratio as they vary with time;

DETAILED DESCRIPTION OF THE PREFERRED EMBODIMENTS

Figure 1:
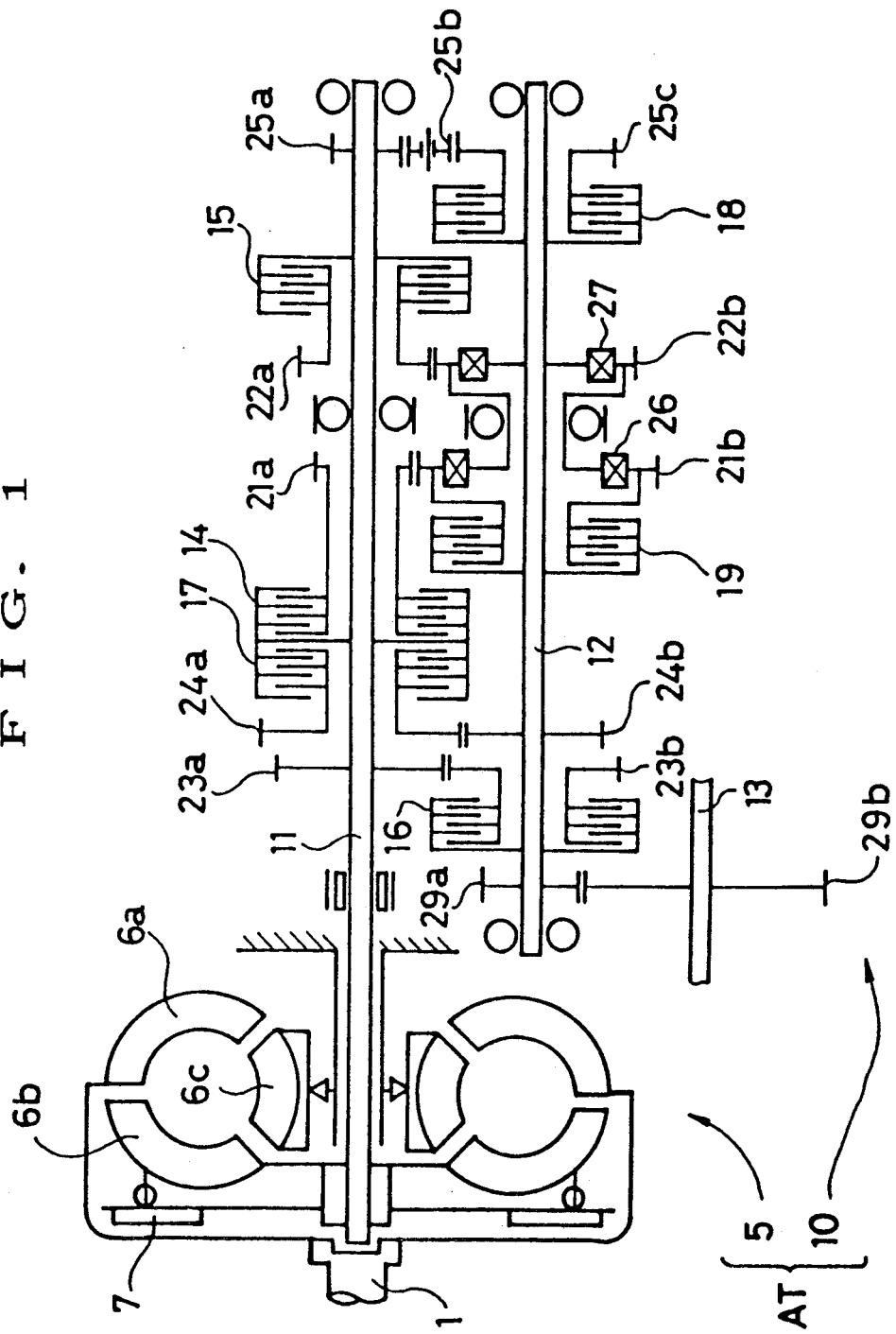
FIG. 1 is a schematic view of a power transmitting system in a transmission according to the present invention.
Figure 2:
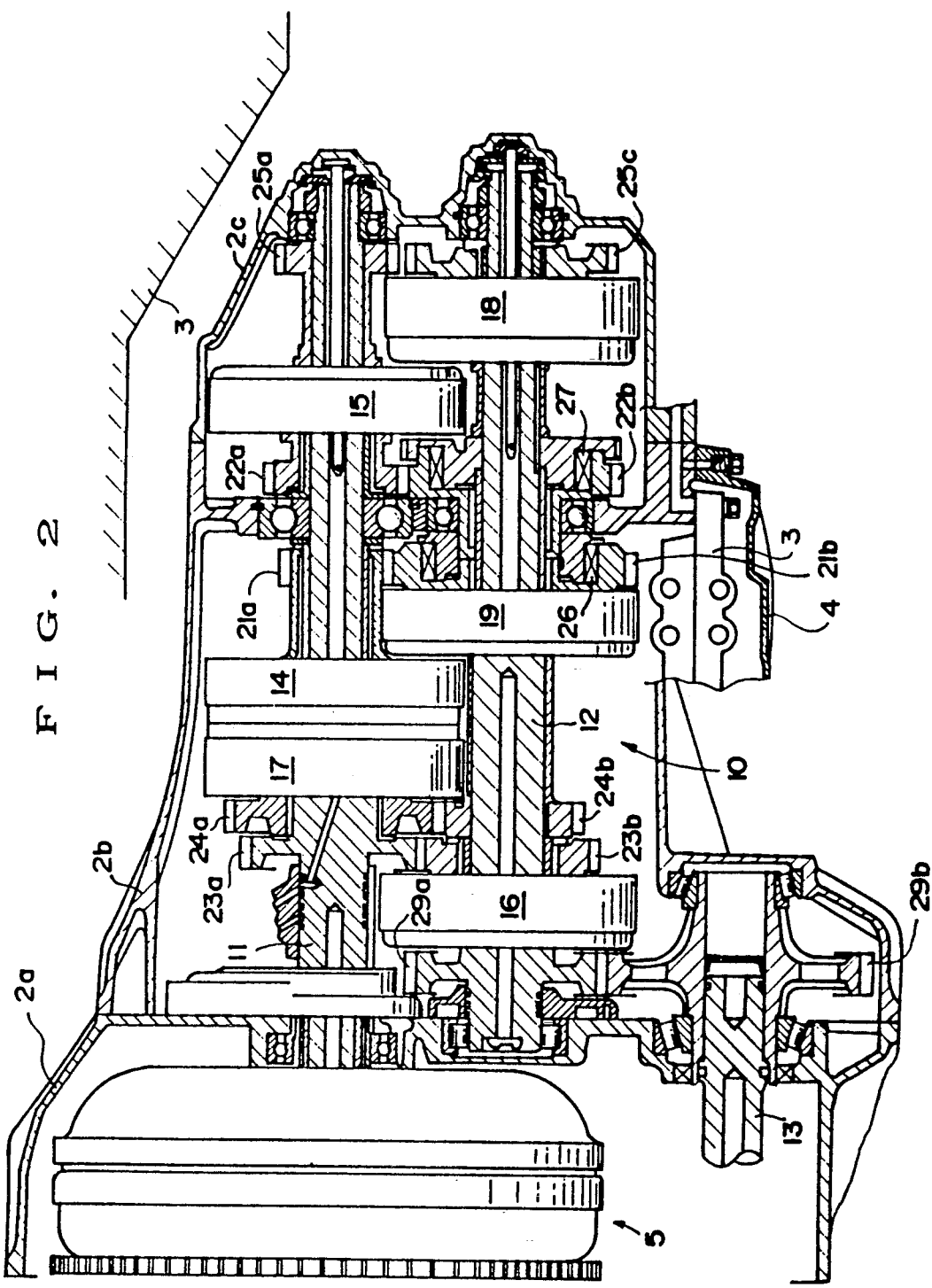
FIG. 2 is a cross-sectional view of the transmission.

FIGS. 1 and 2 schematically show a power transmitting system of a countershaft-type transmission AT for use on an automobile. The transmission AT comprises a torque converter 5 and a transmission mechanism 10 which are accommodated in a transmission housing composed of housing members 2a, 2b, 2c.

The torque converter 5, which is disposed in the transmission housing member 2a, comprises a pump 6a coupled to an engine output shaft 1, a turbine 6b coupled to an output shaft (transmission mechanism input shaft) 11, and a stator 6c fixed in position. The torque converter 5 also includes a lockup mechanism 7 for releasably locking the pump 6a and the turbine 6b to each other.

The transmission mechanism 10, which is disposed in the transmission housing members 2b, 2c, has the input shaft 11 integral with the torque converter output shaft, a countershaft 12 parallel to the input shaft 11, and an output shaft 13 also parallel to the input shaft 11. Between the input shaft 11 and the countershaft 12, there are disposed five gear trains, i.e., a gear train composed of drive and driven gears 21a, 21b for a first gear position, a gear train composed of drive and driven gears 22a, 22b for a second gear position, a gear train composed of drive and driven gears 23a, 23b for a third gear position, a gear train composed posed of drive and driven gears 24a, 24b for a fourth gear position, and a gear train composed of drive and driven gears 25a, 25b, 25c for a reverse gear position. The drive or driven gears of these gear trains are associated respectively with hydraulically operated clutches 14, 15, 16, 17, 18 for selecting the associated gear trains. When the hydraulically operated clutches 14 through 18 are selectively operated, the power transmitting path provided by one of the gear trains is selected for shifting operation. The shifting operation is controlled by a hydraulic pressure control valve 3 attached to a lower surface of the transmission housing member 2b and covered with an oil pan 4 (FIG. 2).

An output gear train composed of gears 29a, 29b is disposed between the countershaft 12 and the output shaft 13. Engine power which has been changed in rotational speed by the above shifting operation is transmitted to the output shaft 13 through the output gears 29a, 29b.

Insofar as the torque imposed by the input shaft 11 is constant, the force acting on the gears of each of the gear trains is larger as the diameter of the drive gears is smaller. Therefore, the first-gear-position gear train composed of the gears 21a, 21b is a highest-load gear train. The loads on the gear trains for the first, second, and third gear positions are progressively smaller in the order named. The drive gear 25a of the reverse gear train has substantially the same diameter as that of the drive gear 21a of the first-gear-position gear train. Therefore, the reverse gear train is also a highest-load gear train.

The driven gears 21b, 22b are associated respectively with one-way clutches 26, 27 which allow power from the engine to be transmitted in a direction to drive the automobile but idly rotate to prevent engine power transmission in the opposite direction (i.e., the direction to apply engine brake). The one-way clutch (first-gear-position one-way clutch) 26 coupled to the driven gear 21b has an input member coupled to the driven gear 21b and an output member which is coupled to an input member of the one-way clutch (second-gear-position one-way clutch) 27 associated with the driven gear 22b. The input member of the one-way clutch 27 is also coupled to the driven gear 22b, and the output member thereof is coupled to the countershaft 12.

The one-way clutches 26, 27 can be locked together by an engine-brake clutch 19. The engine-brake clutch 19 is a clutch for selectively engaging and disengaging the input member of the one-way clutch 26 and the output member of the one-way clutch 27. Transmission of the engine power when the engine-brake clutch 19 is engaged (ON) and disengaged (OFF) will be described below.

When the engine-brake clutch 19 is disengaged and the first-gear-position clutch 14 is engaged, the engine power transmitted to the input shaft 11 is transmitted through the gears 21a, 21b and the one-way clutches 26, 27 to the countershaft 12. If power is transmitted from road wheels (the output shaft 13) while the automobile is being decelerated, since the one-way clutches 26, 27 idly rotate, the power is not transmitted from the countershaft 12 to the input shaft 11, and no engine brake is applied.

When the engine-brake clutch 19 is disengaged and the second-gear-position clutch 15 is engaged, the engine power is transmitted from the input shaft 11 to the countershaft 12 through the gears 22a, 22b and the one-way clutch 27. The power transmitted from the outputshaft 13 in the opposite direction is not transmitted to the input shaft 11 since the one-way clutch 27 idly rotates, and hence no engine brake is applied.

When the engine-brake clutch 19 is engaged and the clutch 14 or the clutch 15 is engaged, the engine power is transmitted from the input shaft 11 through the engine-brake clutch 19 and the respective one-way clutches 26, 27 to the countershaft 12.

If the automobile is decelerated when the engine-brake clutch 19 and the clutch 14 are engaged, the power from the road wheels is transmitted to the input shaft 11 through the engine-brake clutch 19 and the gears 21b, 21a. If the automobile is decelerated when the engine-brake clutch 19 and the clutch 15 are engaged, the power from the road wheels is transmitted to the input shaft 11 through the engine-brake clutch 19, the one-way clutch 26, and the gears 22b, 22a. At this time, the power is transmitted through the one-way clutch 26 since it is transmitted in the direction to drive the automobile. Therefore, when the engine-brake clutch 19 is engaged, there is set up a power transmitting path with engine brake applied, irrespective of whether the first or second gear position is selected.

Figure 3:
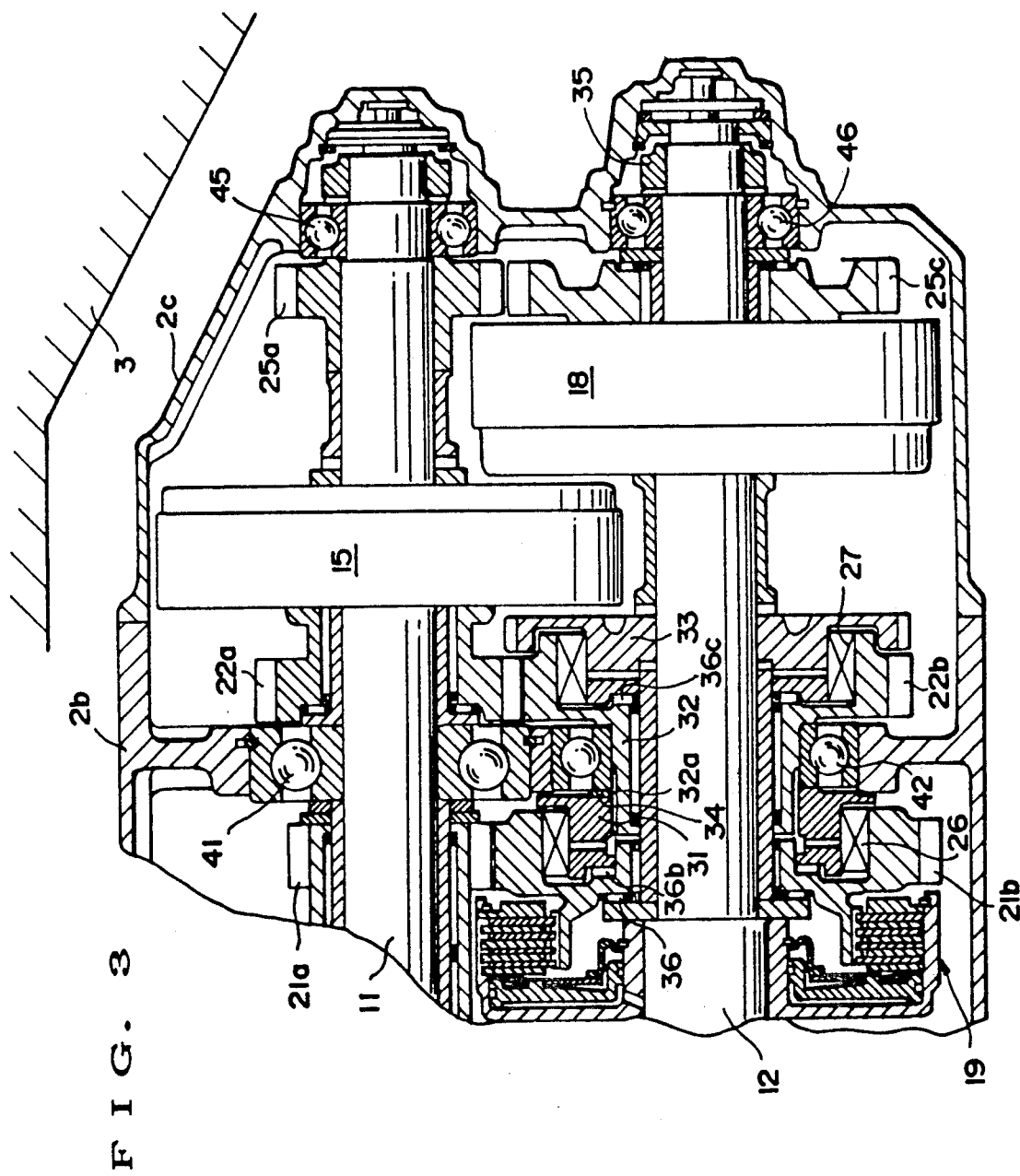
FIG. 3 is an enlarged fragmentary cross-sectional view of the transmission.

The layout of the gears 21a, 21b, the gears 22a, 22b, and the reverse gears 25a, 25b, 25c, which are all high-load gears, in the transmission AT will be described below with reference to FIG 3.

The input shaft 11 and the countershaft 12 are rotatably supported at their intermediate portions by respective bal bearings 41, 42 mounted in the housing member 2b. The righthand ends (FIG. 3) of the input shaft 11 and the countershaft 12 are also rotatably supported by respective ball bearings 45, 46 mounted in the housing member 2c. The gears 21a, 21b are disposed closely to and on the lefthand side of the ball bearings 41, 42, and the gears 22a, 22b are disposed closely to and on the righthand side of the ball bearings 41, 42. Therefore, these gear trains for the first and second gear positions are located one on each side of the ball bearings 41, 42.

Since the high-load gears 21a, 21b and 22a, 22b are disposed near the ball bearings 41, 42 by which the shafts 11, 22 are supported, any bending moment acting on the shafts 11, 12 due to forces applied to these gears is small, and bending or flexing of the shafts 11, 12 is also small.

The one-way clutch 26 for the first gear position is disposed in a radially inner portion of the driven gear 21b. The input member of the one-way clutch 26 is coupled to the driven gear 21b, and the output member thereof is connected to a first connector 31. The one-way clutch 27 for the second gear position is disposed in a radially inner portion of the driven gear 22b. The input member of the one-way clutch 27 is coupled to the driven gear 22b, and the output member thereof is coupled to the countershaft 12 through a hub 33. A second connector 32 is integrally formed with one side of the driven gear 22b and coupled to the first connector 31 through splines 32a, the second connector 32 being disposed radially inwardly of the ball bearing 42.

The engine-brake clutch 19 serves to bring the driven gear 21b selectively into and out of engagement with the countershaft 12, for thereby engaging and disengaging the input member of the one-way clutch 26 and the output member of the one-way clutch 27.

The one-way clutches 26, 27 are located one on each side of the ball bearing 42, and the first and second connectors 31, 32 which connect the output member of the one-way clutch 26 and the input member of the one-way clutch 27 are coupled to each other through a region radially inward of the ball bearing 42. This layout allows the connectors 31, 32 to be arranged simply. Since the connectors 31, 32 are splined to each other, it is possible to install those parts associated with the driven gear 21b on the lefthand side of the bearing 42 and to install those parts associated with the driven gear 22b on the righthand side of the bearing 42. As a result, these parts can easily be assembled together.

The bal bearing 42 has an inner race press-fitted over the second connector 32. The driven gear 22b (and the second connector 32) and the ball bearing 42 which are thus combined with each other are installed as a unitary structure on the countershaft 12. A shim 34 is disposed between the righthand end of the first connector 31 and the lefthand side of the ball bearing 42. With a locknut 35 being fastened, the shim 34 allows three thrust bearings 36a, 36b, 36c to be fitted in appropriate gaps without wobbling movement.

The reverse gears 25a, 25b, 25c which are also high-load gears are disposed adjacent to ball bearings 45, 46 which are positioned in the righthand end of the transmission AT and attached to the housing member 2c. The righthand ends of the input shaft 11 and the countershaft 12 are rotatably supported by the respective ball bearings 45, 46. Accordingly, any bending moment acting on the shafts 11, 12 due to forces applied to the high-load reverse gears 25a, 25b, 25c is small, and bending or flexing of these shafts 11, 12 is also small.

The reverse clutch 18 for selecting the reverse gears 25a, 25b, 25c for the transmission of engine power therethrough is mounted on the countershaft 12. Since the end of the input shaft 11 remote from the torque converter 5 tends to interfere with an automobile body member 3 (typically a floor panel), any outward projection (to the right in FIG. 3) of the end of the input shaft 11 should be as small as possible. With the reverse clutch 18 of large diameter being disposed on the countershaft 12, the outward projection of the end of the input shaft 11 is held to a minimum as shown in FIG. 3. Consequently, a marginal space for the installation of the automobile body member 3 is increased, and limitations on the configuration of the automobile body member 3 are reduced, with the result that the automobile body member 3 can be of increased rigidity.

As described above, the two high-load gear trains (21a, 21b and 22a, 22b) which are associated with the respective one-way clutches are disposed one on each side of the bearings by which the shafts are rotatably supported. The connector which connects the output member of one of the one-way clutches to the input member of the other one-way clutch is disposed radially inwardly of one of the bearings. As a consequence, any bending moment acting on the shafts due to forces applied to the high-load gear trains and hence bending or flexing of the shafts are reduced. As the two high-load gear trains are disposed closely to each other, the input member of one of the one-way clutches and the output member of the other one-way clutch can easily be coupled to each other, and the resulting assembly is compact. The layout of the gear trains and the clutches in the transmission is therefore optimized for lightweight and compact transmission configuration.

The two high-load gear trains (21a, 21b and 22a, 22b) are disposed one on each side of the shaft bearings, and the third high-load gear train (25a, 25b, 25c) is disposed near an end of the transmission with the clutch means for selecting the third high-load gear train being mounted on the countershaft. This arrangement minimizes any outward projection of the end of the input shaft which would otherwise tend to interfere with the automobile body member. Therefore, a marginal space for the installation of the automobile body member is increased, and the configuration of the automobile body member is subject to less limitations, resulting in an increase in the rigidity of the automobile body member.

Figure 4:
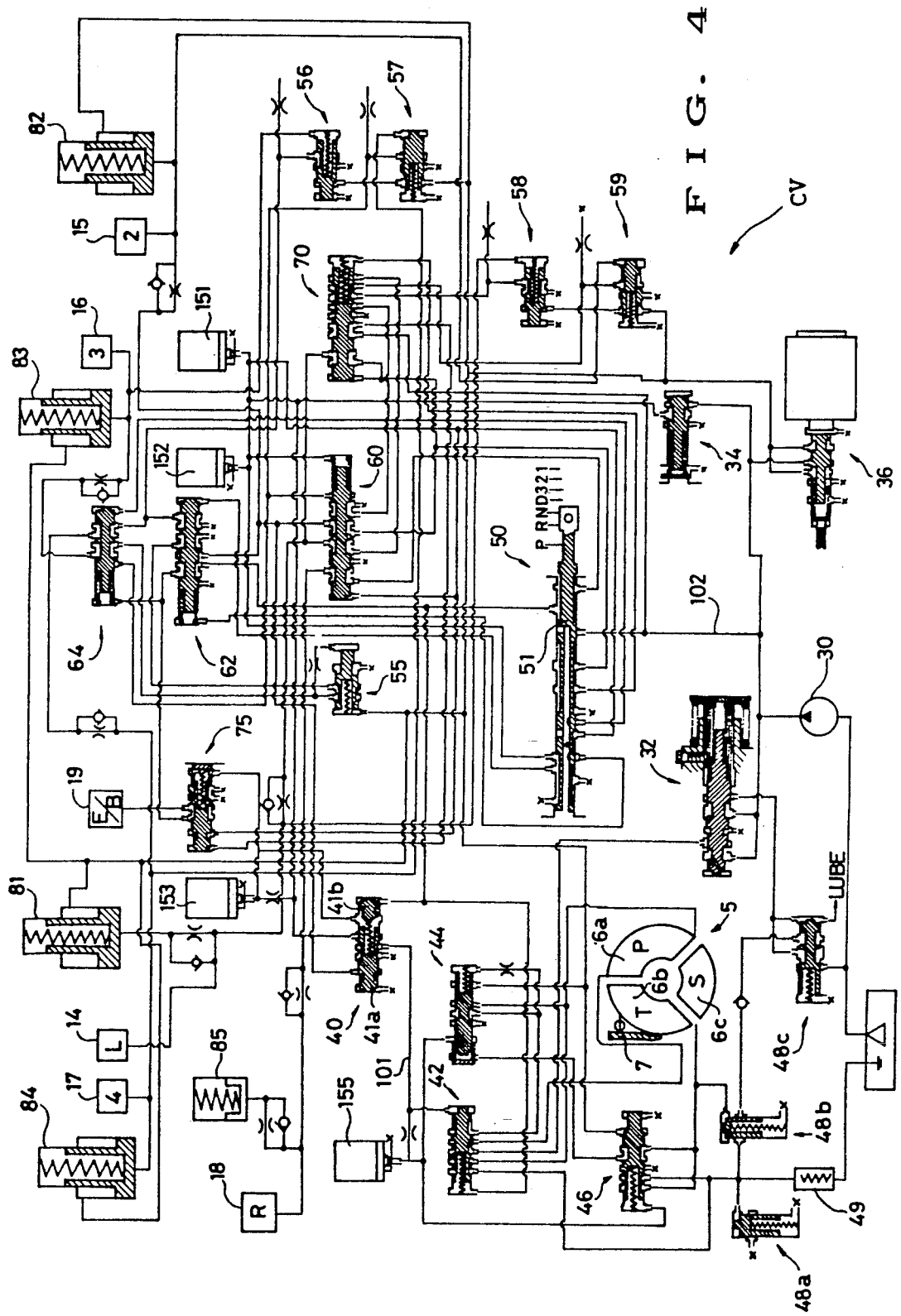
FIG. 4 is a circuit diagram of a hydraulic circuit of a control valve assembly as a controlling apparatus according to the present invention.

The lockup mechanism 7 of the torque converter 5 and the clutches 14 through 19 of the transmission mechanism 10 in the transmission AT are controlled in operation by a control valve assembly CV, the hydraulic circuit of which is shown in FIG. 4.

The control valve assembly CV comprises a regulator valve 32 for regulating the pressure of working oil supplied from a charging pump 30 to a line pressure PL, a modulator valve 34 for producing a modulated pressure PM from the line pressure, and a throttle valve 36 for converting the line pressure PL into a throttle valve PTH with a linear solenoid. The control valve assembly CV also has other valves (described below) for the control of operation of the lockup mechanism 7 and the various clutches with the line pressure PL, the modulated pressure PM, and the throttle pressure PTH.

Control valves for controlling the lockup mechanism 7 will be described below. These control valves include an L/C on-off valve 40, an L/C shift valve 42, an L/C control valve 44, an L/C timing valve 46, and a duty solenoid valve 155. The L/C on-off valve 40 serves to control or turn on and off the supply of the line pressure PL to a line 101, for thereby turning on and off, or activating and inactivating, the lockup mechanism 7. The other valves serve to control the extent of engagement of the lockup mechanism 7 when the lockup mechanism 7 is activated by the L/C on-off valve 40. The operation of these valves is well known in the art and will not be described in detail.

Oil returning from the torque converter 5 is regulated in pressure by relief valves 48a, 48b, 48c, and thereafter is used for lubrication, or cooled by a cooler 49 and returned to an oil tank.

Valves for controlling operation of the clutches 14 through 19 in the transmission mechanism 10 to effect shifting operation will be described below.

One of these valves is a manual valve 50 having a spool 51 which is moved in response to operation of the shift lever by the driver. The spool 51 can be moved to seven positions such as P, R, N, D, 3, 2, 1 positions corresponding to the positions to which the shift lever can be moved. There are established different transmission ranges corresponding to the positions of the spool 51. The line pressure PL from a line 102 is supplied to ports of the manual valve 50 which correspond to the positions of the spool 51. The control valve assembly CV also includes a 1-2 shift valve 60 for controlling shifting operation between the first and second gear positions, a 2-3 shift valve 62 for controlling shifting operation between the second and third gear positions, and a 3-4 shift valve 64 for controlling shifting operation between the third and fourth gear positions. Operation of these shift valves 60, 62, 64 is controlled by the modulated pressure PM which is selectively supplied when first and second on-off solenoid valves 151, 152 are actuated (ON) and inactivated (OFF). The shift valves 60, 62, 64 are operated for shifting the transmission depending on combinations of ON and OFF conditions of the solenoid valves 151, 152.

The control valve assembly CV also has a clutch pressure control valve 55 and four orifice control valves 56 through 59. The clutch pressure control valve 55 serves to convert the operating pressure for the clutches 14 through 18 into a pressure corresponding to the throttle valve PTH. The orifice control valves 56 through 59 are valves for releasing the hydraulic pressure from a previously engaged clutch in timed relation to an increase in the hydraulic pressure on a subsequently engaged clutch when the transmission is shifted from one gear position to another gear position. The orifice control valves 56, 57, which are 4-3 and 3-4 orifice control valves, respectively, release the hydraulic pressure from the clutches for the third and fourth gear positions when the transmission is shifted from the fourth gear position to the third gear position and from the third gear position to the fourth gear position, respectively. The orifice control valves 58, 59, which are 2-1 and 1-2 orifice control valves, release the hydraulic pressure from the clutches for the first and second gear positions when the transmission is shifted from the second gear position to the first gear position and from the first gear position to the second gear position.

The control valve assembly CV also includes a switching valve 70 for switching between the control of the engine-brake clutch 19 and the lockup mechanism 7, an engine-brake timing valve 75 for controlling the operation of the engine-brake clutch 19, and a third on-off solenoid valve 153 which is used in the control of the lockup mechanism 7 and the engine-brake clutch 19. These valves will be described later on.

Accumulators 81 through 85 are connected respectively to the clutches 14 through 18 for smoothing out hydraulic pressure fluctuations to effect smooth gear shifts when the clutches 14 through 18 are engaged.

When the shift lever is moved by the driver, the manual valve 50 is operated and the first through third solenoid valves 151, 152, 153 are actuated (ON) and inactivated (OFF) to operate the various valves referred to above for thereby controlling the supply of hydraulic pressure to the clutches 14 through 19, so that the operation of the lockup mechanism 7 is controlled.

The first and second solenoid valves 151, 152 are normally closed solenoid valves. Transmission gear positions are set up as shown in FIG. 5 depending on the combinations of ON and OFF conditions of the first and second solenoid valves 151, 152 and the ranges which correspond to the positions of the manual valve 55. In FIG. 5, the gear position LOW indicates the transmission of the engine power through the gear train for the first gear position. Engine brake is available in those gear positions which are enclosed by circles.

When the shift lever is in the D-position and the manual valve 50 is in the D-range, the four gear positions, i.e., the first gear position (LOW), the second gear position (2ND), the third gear position (3RD), and the fourth gear position (4TH), are set up, as shown in FIG. 5, depending on the four combinations of the ON and OFF conditions of the first and second solenoid valves 151, 152. When the manual valve 50 is in the 3-range, the three gear positions, i.e., the first gear position (LOW), the second gear position (2ND), and the third gear position (3RD), are set up, as shown in FIG. 5, depending on the four combinations of the ON and OFF conditions of the first and second solenoid valves 151, 152. In these D- and 3-ranges, the engine-brake clutch 19 is disengaged and no engine brake is available in the first gear position (LOW) and the second gear position (2ND). In the third and fourth gear positions, however, the engine power is transmitted through direct power transmitting paths, and engine brake is available.

When the shift lever is in the 2-position or the 1-position and the manual valve 50 is in the 2-range or the 1-range, the first gear position (LOW), the second gear position (2ND), and the third gear position (3RD), are set up in the 2-range, and the first gear position (LOW) and the second gear position (2ND) are set up in the 1-range, as shown in FIG. 5, depending on the four combinations of the ON and OFF conditions of the first and second solenoid valves 151, 152. In these 2- and 1-ranges, the engine-brake clutch is engaged and engine brake is available in the first and second gear positions.

The gear positions which are established depending on the combinations of the ON and OFF conditions of the solenoid valves 151, 152 are selected according to shift maps, shown in FIGS. 6A through 6D, which depend on engine throttle opening $\theta$TH and automobile speed V in the respective ranges. The shift maps shown in FIGS. 6A through 6D correspond respectively to the D-, 3-, 2-, and 1-ranges.

Figure 6A:
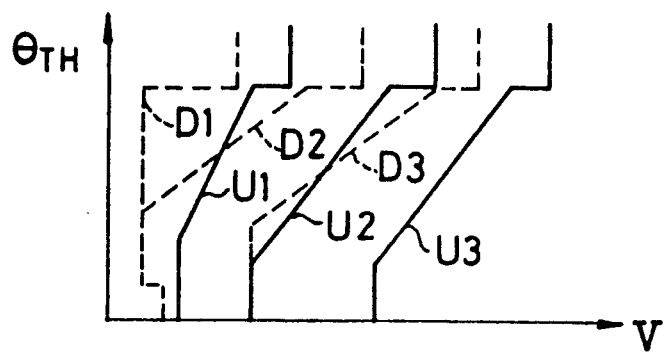
FIGS. 6A and 6D are graphs showing shift maps used in the shifting operation of the controlling apparatus.
Figure 6B:
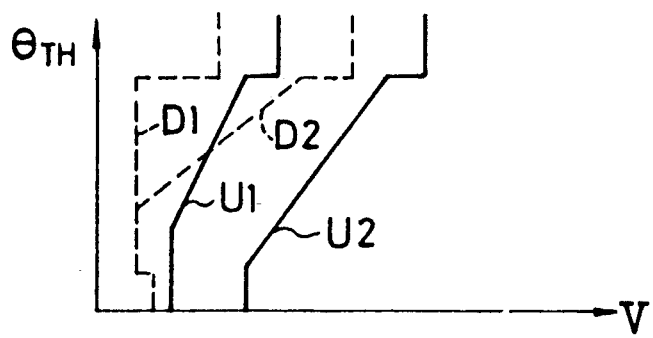

The D-range shift map shown in FIG. 6A has three upshift curves U1, U2, U3 and three downshift curves D1, D2, D3. The transmission is shifted from the first gear position to the second gear position and from the second gear position to the first gear position across the curves U1, D1. The transmission is shifted from the second gear position to the third gear position and from the third gear position to the second gear position across the curves U2, D2. The transmission is shifted from the third gear position to the fourth gear position and from the fourth gear position to the third gear position across the curves U3, D3. Gear shifts are carried out when a point determined by the throttle opening $\theta$TH and the automobile speed V moves across the shift curves. The 3-range shift map shown in FIG. 6B is similar to the D-range shift map except that the curves U3, D3 are dispensed with and the transmission is shifted between the first gear position and the third gear position.

Figure 6C:
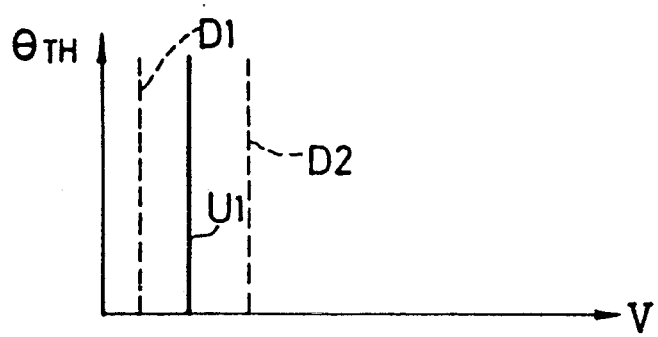

The 2-range shift map shown in FIG. 6C has a single upshift curve U1 and two downshift curves D1, D2. The shift map has no upshift curve from the second gear position to the third gear position because the transmission is basically shifted between the first and second gear positions in the 2-range. When the shift lever is moved to the 2-range while the automobile is running in the third gear position in the 3-range, a downshift is carried out from the third gear position to the second gear position across the downshift curve D2 in FIG. 6C, so that a downshift to the second gear position with engine brake will not be effected at too a high automobile speed.

Figure 6D:
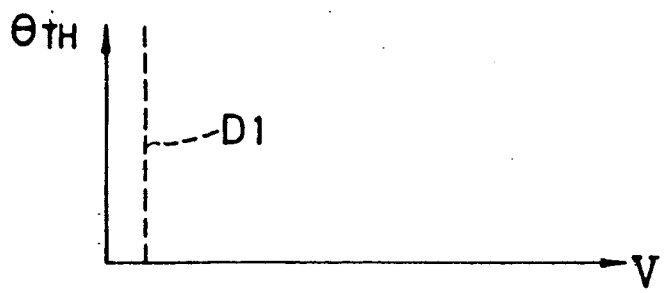

The shift map shown in FIG. 6D is employed in the 1-range. In the 1-range, the transmission is fixed to the first gear position (LOW). When the shift lever is moved, a downshift to the 1-range is effected across the downshift curve D1, so that a downshift to the first gear position with engine brake will not be effected at too a high automobile speed.

Upon system failures (system down), such as when the solenoid valves 151, 152 are inactivated (OFF), the transmission is held in the highest gear positions in the respective ranges (see FIG. 5). Therefore, in the event of a system failure, the transmission is prevented from downshifting to a lower gear position and abrupt engine brake forces are prevented from being applied, and the transmission can manually be shifted from the fourth gear position to the second gear position by the shift lever. The transmission is thus operated under fail-safe control.

In the R-range, the reverse gear position is set up. Although not shown, in both P- and N-ranges, all the clutches are disengaged, and the transmission is kept in the neutral condition.

In FIG. 5, the second gear position (2ND) in the D- and 3-ranges in which the engine-brake clutch is disengaged is set up when both the first and second solenoid valves 151, 152 are activated. The second gear position in the 2- and 1-range in which the engine-brake clutch is engaged is set up when both the solenoid valves 151, 152 are engaged or disengaged. Actually, the second gear position in these 2- and 1-ranges is used when both the solenoid valves 151, 152 are disengaged.

If the second gear position in the 2- or 1-range were used when both the solenoid valves 151, 152 are activated, the following problem would arise: When the shift lever is moved to the 2- or 1-range to effect a downshift to the second gear position while the automobile is running at the fourth gear position in the D-range, if the first solenoid valve 151 suffers a wire breakage and hence is inactivated at all times, then the solenoid valves 151, 152 are inactivated (OFF) and activated (ON), respectively, even with a shift command to the second gear position being issued, and the transmission downshifts not to the second gear position but to the first gear position (LOW). Since the engine-brake clutch is engaged (ON) at this time, engine brake is applied to greatly decelerate the automobile, resulting in a shift shock. According to the present invention, the second gear position in the 2- and 1-ranges is used when both the solenoid valves 151, 152 are inactivated. Therefore, the above problem does not occur even if one or both of the solenoid valves 151, 152 suffer a wire breakage.

In the D- and 3-ranges, the second gear position is set up when both the solenoid valves 151, 152 are activated. This is because, in the event of a system failure, the highest gear position (i.e., the fourth gear position in the D-range and the third gear position in the 3-range) is set up, and hence the OFF conditions of both the solenoid valves cannot be assigned to the second gear position, and also because, in the D- and 3-ranges, the engine brake clutch is disengaged and no engine brake is applied even if the transmission downshifts to the first gear position, so that no shift shock is caused.

The gear positions are set up as described above by the first and second solenoid valves 151, 152, i.e., the operation of the clutches 14 through 18 is controlled as described above. The transmission AT further requires the engine-brake clutch 19 and the lockup mechanism 7 to be controlled in their operation. Such control of the engine-brake clutch 19 and the lockup mechanism 7 will be described below with reference to FIG. 7.

The engine-brake clutch 19 and the lockup mechanism 7 are controlled depending on the activation and inactivation of the third solenoid valve 153 which is a normally closed solenoid valve. In the D- and 3-ranges, the engine-brake clutch 19 is disengaged at all times as shown in FIG. 5, and therefore the lockup mechanism 7 is activated (ON and inactivated (OFF) when the third solenoid valve 153 is activated (ON) and inactivated (OFF), respectively. In the 2- and 1-ranges, the lockup mechanism 7 is inactivated at all times, and the engine-brake clutch 19 is activated (ON) and inactivated (OFF) when the first and third solenoid valves 151, 153 are activated and inactivated, respectively.

Figure 8:
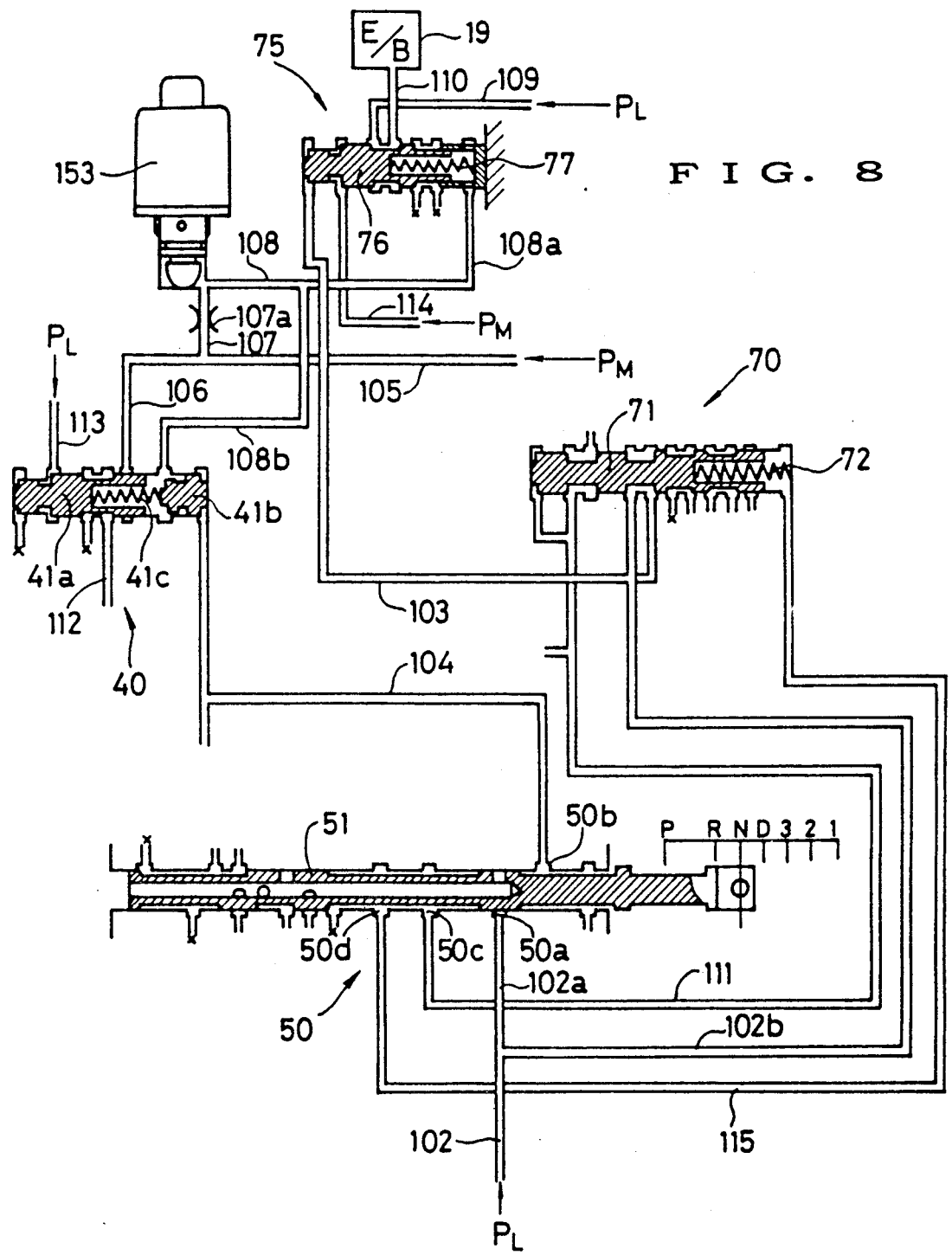
FIG. 8 is a circuit diagram of a portion of the hydraulic circuit shown in FIG. 4.

The third solenoid valve 153 is used to control the operation of the lockup mechanism 7 in the D- or 3-range, and to control the operation of the engine-brake clutch 19 in the 2- or 1-range. FIG. 8 fragmentarily shows a portion of the hydraulic circuit shown in FIG. 4, which is employed to effect such control. Operation of the circuit portion shown in FIG. 8 will be described below. As shown in FIG. 8, the manual valve 50, the L/C on-off valve 40, the switching valve 70, the engine-brake timing valve (engine-brake clutch control valve) 75, and the third solenoid valve 153 are employed in this control procedure.

The D- or 3-range will first be described below. To select the D- or 3-range, the spool 51 of the manual valve 50 is moved from the illustrated N-position to the D- or 3-position. In the D- or 3-position, ports 50c, 50d of the manual valve 50 communicate with a port 50a thereof, allowing the line pressure PL from the line 102 to act through lines 111, 115 on the opposite ends of the switching valve 70. A spool 71 of the switching valve 70 is pushed to a left position by a spring 72 as shown in FIG. 8.

The line pressure PL supplied from the line 102 is exerted through a line 102b, a groove in the spool 71 of the switching valve 70, and a line 103 to the lefthand end of the engine-brake timing valve 75. In response to the line pressure PL, a spool 76 of the valve 75 is moved to the right against the resiliency of a spring 77 until a line 109 supplied with the line pressure PL and a line 110 connected to the engine-brake clutch 19 are disconnected from each other by a land of the spool 76. Therefore, the engine-brake clutch 19 is disengaged. As described later on, when the third solenoid valve 152 is inactivated, the modulated pressure PM supplied to a line 105 acts on the righthand end of the spool 76. However, the line pressure PL is considerably higher than the modulated pressure PM, and even when the modulated pressure PM is applied, the spool 76 remains in the righthand end position, and the engine-brake clutch 29 remains disengaged.

In the D- or 3-range, the third solenoid valve 153 is used to control activation and inactivation of the lockup mechanism 7. A line 108 connected to the third solenoid valve 153 is supplied with the modulated pressure PM, which is to be supplied to the line 105, through a line 107 having an orifice 107a. When the normally-closed third solenoid valve 153 is inactivated, the modulated pressure PM is exerted in the line 108, and when the third solenoid valve 103 is activated, the pressure in the line 108 is substantially zero. The line 108 is connected to the righthand end of a first spool 41a of the L/C on-off valve 40 through a line 108b. When the third solenoid valve 153 is inactivated, the modulated pressure PM acts on the righthand end of the first spool 41a, moving the first spool 41a to the left as shown in FIG. 8. A line 112 now communicates to drain, and the lockup mechanism 7 is inactivated.

The spool 41a is subjected to the line pressure PL supplied from a line 113 and tending to push the spool 41a to the right. Since the area of the spool 41a which bears the line pressure PL is small, the spool 41a is moved to the left when the modulated pressure PM supplied from the line 108b acts on the spool 41a irrespective of whether the line pressure PL is exerted on the spool 41a or not. When the third solenoid valve 153 is actuated to reduce the pressure in the line 108b to zero, the spool 41a is moved to the right under the line pressure PL from the line 113. The rightward movement of the spool 41a causes the line 112 to be connected to a line 106, whereupon the lockup mechanism 7 is activated by the modulated pressure PM which is supplied from the line 106 to the line 112.

As described above, in the D- or 3-range, the engine-brake clutch 19 is disengaged at all times, and the activation and inactivation of the lockup mechanism 7 are controlled by the activation and inactivation of the third solenoid valve 153.

The 2- or 1-range will now be described below. In the 2- or 1-range, the spool 51 of the manual valve 50 is moved further to the right into the 2- or 1-position. In the 2- or 1-position, the port 50c remains connected to the line 102 through the groove in the spool 51, and the port 50d is connected to drain. The line pressure PL from the line 102 through the line 111 remains applied to the lefthand end of the switching valve 70, and the hydraulic pressure supplied from the line 115 and acting on the righthand end of the switching valve 70 is reduced to zero. Therefore, the spool 71 of the switching valve 70 is moved to the right against the bias of the spring 72.

Upon the rightward movement of the spool 71, the line 102b and the line 103 are disconnected from each other by a land of the spool 71, and the line 103 is connected to drain. The spool 76 of the engine-brake timing valve 75 is now moved to the left into the illustrated position under the bias of the spring 77. The line 109 and the line 110 are now brought into communication with each other through the groove in the spool 76. The engine-brake clutch 19 is supplied with the line pressure PL from the line 109, and hence is engaged.

When the first solenoid valve 151 is inactivated, the spool 76 is supplied with the modulated pressure PM from a line 114, which pressure tends to move the spool 76 to the left. When the third solenoid valve 153 is actuated and the pressure supplied from a line 108a and acting on the righthand end of the spool 76 is zero, the spool 76 is moved to the left and the engine-brake clutch 19 is inactivated. This condition is shown in FIG. 7. In the 1- and 2-ranges, the operation of the engine-brake clutch 19 is controlled depending on the activation and inactivation of the first and third solenoid valves 151, 153.

Operation of the engine-brake clutch 19 in the event that one of the first and third solenoid valves 151, 153 is inactivated due to a wire breakage or the like will be reviewed with reference to FIG. 7. When one of the first and third solenoid valves 151, 153 is inactivated due to a wire breakage or the like, their conditions are possible in three combinations: OFF and OFF conditions, ON and OFF conditions, and OFF and ON conditions. The engine-brake clutch 19 is disengaged when the first solenoid valve 151 is inactivated (OFF) and the third solenoid valve 153 is activated (ON), and the engine-brake clutch 19 is engaged in the other combinations of the conditions of the first and third solenoid valves 151, 153. In this case, however, if the third solenoid valve 153 which operates normally is inactivated (OFF), then the engine-brake clutch 19 can be engaged.

Therefore, even if one of the two solenoid valves 151, 153 for controlling the operation of the engine-brake timing valve 75 fails due to a wire breakage or the like, the engine-brake clutch 19 may be engaged by operation of the other solenoid valve. In this manner, in the event of a failure such as a wire breakage of the solenoid valves, a gear position in which engine brake is available is set up for increased safety while the automobile is running.

In the 1- or 2-range, a port 50b of the manual valve 50 communicates with the port 50a, allowing the line pressure from the line 102 to act on the righthand end of a second spool 41b of the L/C on-off valve 40 through a line 104. The second spool 41b is now moved to the left, holding the first spool 41a in the illustrated lefthand position. Therefore, the line 112 is continuously connected to drain, so that the lockup mechanism 7 is inactivated at all times. Thus, the lockup mechanism 7 of the torque converter 5 is inactivated at all times in the 1- or 2-range.

The above control process is summarized as follows: In the D- or 3-range, the engine-brake clutch 19 is always disengaged, setting up a gear position with no engine brake available, i.e., with a one-way clutch associated, and at the same time, the lockup mechanism 7 is controlled in operation by the third solenoid valve 153. In the 1- or 2-range, the lockup mechanism 7 is always inactivated, and the engine-brake clutch is controlled in operation by the third solenoid valve 153, normally setting up a gear position with engine brake available.

Shifting operation in the 2- or 1-range is effected between gear positions each with engine brake available. For shifting the transmission from the second gear position to the first gear position, the shifting timing is controlled by the 2-1 orifice control valve 58, and for shifting the transmission from the first gear position to the second gear position, the shifting timing is controlled by t the 1-2 orifice control valve 59. Therefore, the transmission can be shifted smoothly without a large shift shock.

As described above, even if one of the two solenoid valves which control the operation of the engine-brake clutch control valve fails and cannot be activated due to a wire breakage or the like, the other solenoid valve may be employed to cause the engine-brake clutch control valve to engage the engine-brake clutch. Therefore, a power transmitting path (gear position) with engine brake available can always be set up. The transmission controlling apparatus therefore provides a fail-safe function against failures of the solenoid valves, and the automobile with its transmission controlled by the transmission control apparatus is given increased safety while it is running.

The power transmitting paths in the ranges which are selected by the manual valve are established depending on the combinations of the ON and OFF conditions of the two solenoid valves. If both the solenoid valves fail and are inactivated, a power transmitting path with a minimum speed reduction ratio, i.e., a power transmitting path with a highest gear position, is set up in each of the ranges. Therefore, in the event of a system failure, a lower gear position is prevented from being set up, and hence a large engine brake force is prevented from being generated. Accordingly, the automobile with the transmission thus controlled is rendered highly safe while it is running. In the case where the ranges have different highest gear positions, if both the solenoid valves are inactivated, the manual valve can be operated by the shift lever to change the ranges for thereby setting up different gear positions, i.e., manual shifting operation can be achieved.

Shifting control with the apparatus for controlling the transmission AT will be described below.

FIG. 9 shows various signals, clutch pressure, and clutch input/output rotational speed ratio which vary with time, when the shift lever is moved to the 2-range for a downshift to the second gear position at the time the accelerator pedal is depressed while the automobile is running in the fourth gear position in the D-range. Shifting control will be described by way of example with reference to the graphs of FIG. 9.

At a time t1, the shift lever is operated on to enable the manual lever 50 to switch from the D-range to the 2-range. At the same time, the first and second solenoid valves 151, 152 are operated such that the gear position which is set up by these solenoid valves is shifted from the fourth gear position to the second gear position. The shift valve is operated to cause the hydraulic pressure P4 of the fourth-gear-position clutch 17 to drop quickly as it is drained. In the D-range, however, since the engine-brake clutch 19 is disengaged, the second-gear-position clutch 15 is engaged at all times, and the hydraulic pressure P2 of the second-gear-position clutch is maintained at a predetermined level (line pressure) for this shifting operation.

At the time t1 (when the shifting operation is started), the third solenoid valve 153 is activated to disengage the engine-brake clutch 19. After elapse of a given time T, the third solenoid valve 153 is inactivated to engage the engine-brake clutch 19. The time T is equal to, or longer than, a time in which the rotational speeds of the input an output members of the second-gear-position clutch 15 are synchronized. The engine-brake clutch 19 is engaged when or after the rotational speeds of the input and output members of the second-gear-position clutch 15 are synchronized.

In this shifting operation, when the fourth-gear-position clutch is disengaged, the one-way clutch 27 idly rotates until the rotational speeds of the input and output members of the second-gear-position clutch are synchronized. When the rotational speeds are synchronized, the one-way clutch 27 starts to transmit the engine power. Therefore, the transmission is shifted smoothly. Inasmuch as the engine-brake clutch 19 is engaged after the rotational speeds of the input and output members of the second-gear-position position clutch are synchronized, smooth shifting operation is not impaired.

As can be understood from the above description, no problem arises even if the engine-brake clutch 19 is abruptly engaged. Therefore, as shown in FIG. 4, any accumulator such as the accumulators 81 through 85 connected to the shifting clutches 14 through 18 is not required to be connected to the engine-brake clutch 19.

After the shifting operation has started, the time T until the engine-brake clutch is engaged is measured by a timer. This time T is the same as the time until the rotational speeds of the input and output members of the shifting clutch are synchronized. Therefore, the rotational speeds of the input and output members of the shifting clutch may be directly detected, and a time at which the ratio of the input and output member rotational speeds becomes 1.0 may be detected, as shown in the lowermost graph of FIG. 9, thereby detecting speed synchronization. The engine-brake clutch may then be engaged when the speed synchronization is detected.

The above control process is not limited to the foregoing specific example, but may be applicable to various shifting operations in which the range is shifted from the D- or 3-range to the 2- or 1-range while the accelerator pedal is being depressed (power-on mode), for a downshift from the fourth or third gear position to the second or first gear position, such that all these shifting operations can smoothly be carried out.

The control process is also not limited to shifting operations initiated by the shift lever, but may be applied to a shift from the third gear position to the second gear position or from the second gear position to the first gear position in the 2-range, for example, such that the engine-brake clutch is temporarily released for smooth shifting operation.

For a shift from the second gear position to the first gear position, the shifting timing is controlled by the 2-1 orifice control valve 58, and for a shift from the first gear position to the second gear position, the shifting timing is controlled by the 1-2 orifice control valve 59. Even while the engine-brake clutch 19 is being engaged, the transmission can therefore be shifted smoothly without suffering a large shift shock.

The above control procedure is followed upon a downshift in the power-on mode. For a downshift when the accelerator pedal is released (power-off mode), since the rotational speeds of the input and output members of the shifting clutch vary away from each other, it is necessary to engage the engine-brake clutch 19 immediately when the fourth-gear-position clutch is disengaged. It is preferable that the engine-brake clutch be engaged gradually to effect smooth shifting operation.

Figure 10:
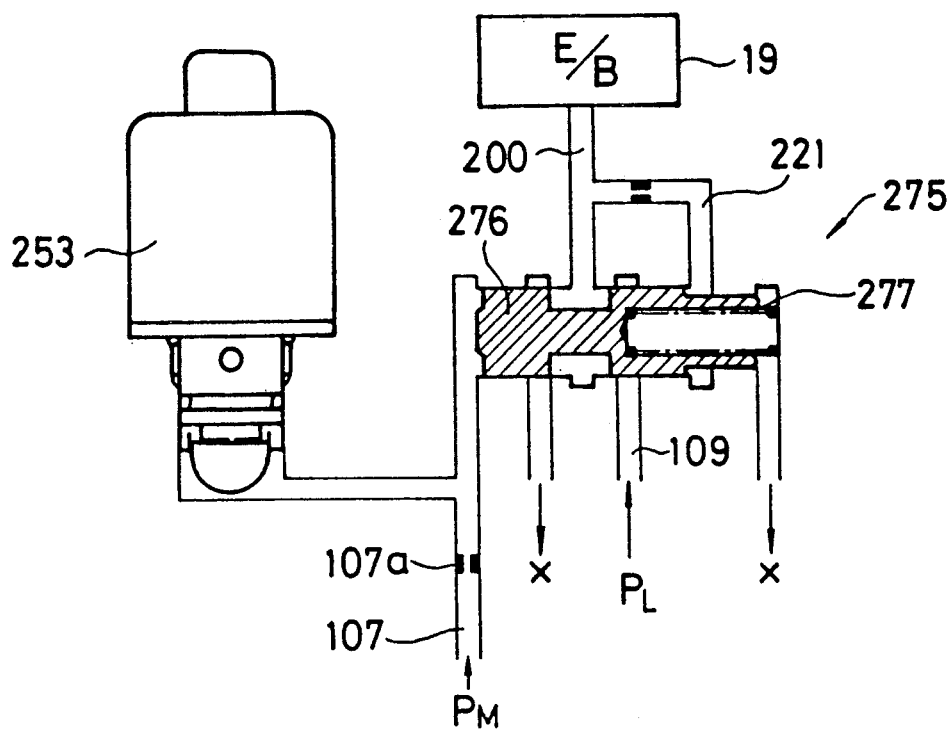
FIGS. 10 and 11 are circuit diagrams showing other hydraulic circuits used for the control of the engine-brake clutch.

Such gradual engagement of the engine-brake clutch may be effected as shown in FIG. 10. More specifically, in FIG. 10, the third solenoid valve 153 is replaced with a duty-ratio-controllable solenoid valve 253, and the engine-brake timing valve 75 is replaced with an engine-brake control valve 275. In this arrangement, a control pressure converted by the duty control solenoid valve 253 is applied to the lefthand end of a spool 276 of the engine-brake control valve 275, and the biasing force of a spring 227 and the engine-brake clutch pressure are imposed on the righthand end of the spool 276. The hydraulic pressure supplied from a line 109 and acting on the engine-brake clutch 19 through a line 220 is controlled depending on the duty ratio. Engagement of the engine-brake clutch 19 can be controlled as desired for smooth shifting operation.

Figure 11:
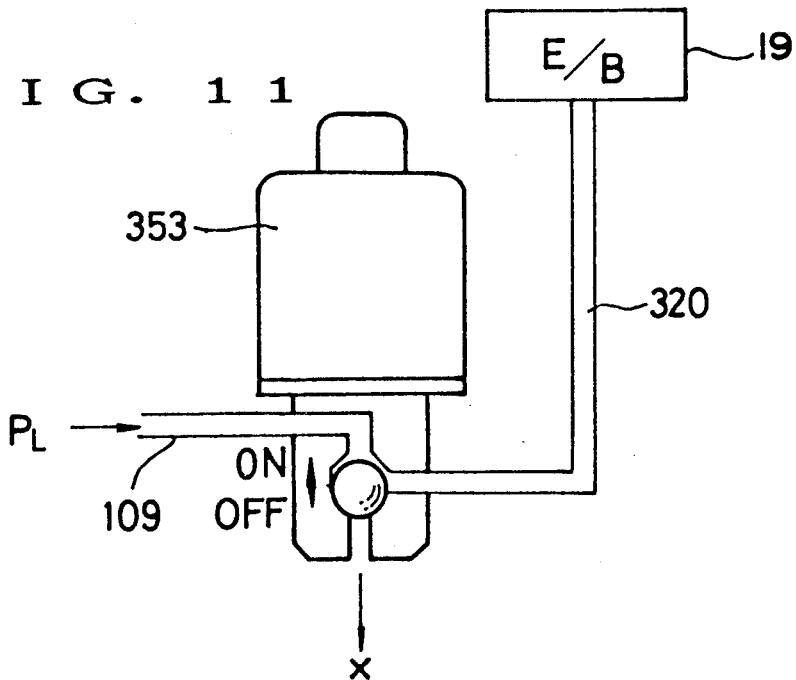

Engagement of the engine-brake clutch 19 may also be controlled as shown in FIG. 11 in which the engine-brake control valve 275 shown in FIG. 10 is dispensed with and a three-way solenoid valve 353 which can selectively be activated and inactivated is employed for directly controlling the hydraulic pressure to be supplied to the engine-brake clutch 19.

As described above, when the shift lever is operated on while the accelerator pedal is being depressed (power-on mode) to effect a downshift to a gear position (power transmitting path) in which engine brake is available, the engine-brake clutch is disengaged (OFF) and the transmission is shifted to the gear position through the one-way clutch until the rotational speeds of the input and output members of a shifting means (e.g., a shifting clutch) for setting up the gear position are synchronized after the starting of the shifting operation. When the rotational speeds are synchronized thereafter, the engine-brake clutch is engaged to set up the gear position in which engine brake is available. The shifting operation is therefore effected smoothly through the one-way clutch. Since no problem arises even if the engine-brake clutch is abruptly engaged at this time, no accumulator is required in combination with the engine-brake clutch, and hence the hydraulic pressure control valve assembly is small in size and light in weight.

The invention being thus described, it will be obvious that the same ma be varied in many ways. Such variations are not to be regarded as a departure from the spirit and scope of the invention, and all such modifications as would be obvious to one skilled in the art are intended to be included within the scope of the following claims.

We claim:

1. An apparatus for controlling shifting operation of a transmission for selecting one, at a time, of a plurality of power transmitting paths having different speed reduction ratios, the power transmitting paths including at least one power transmitting path which has a one-way clutch for transmitting power only in a driving direction and an engine-brake clutch for bypassing said one-way clutch, said apparatus comprising:
   an engine-brake clutch timing control valve for controlling said engine-brake clutch; and
   two solenoid valves for simultaneously controlling said engine-brake clutch control valve;
   the arrangement being such that, when one of said two solenoid valves fails and is inactivated, the other solenoid valve is used to cause said engine-brake clutch timing control valve to engage said engine-brake clutch.

2. An apparatus for controlling shifting operation of a transmission for selecting one, at a time, of a plurality of power transmitting paths having different speed reduction ratios, comprising, an output shaft, said power transmitting paths including gear trains for first and second gear positions, first- and second-gear position one-way clutches for transmitting power to be transmitted only in the driving direction, an engine-brake clutch for bypassing at least one of said one-way clutches, an engine-brake clutch timing control valve for controlling said engine-brake clutch, and two solenoid valves for simultaneously controlling said engine-brake clutch timing control valve, said one-way clutches being disposed respectively in the gear trains for the first and second gear positions, each of said first- and second-gear position one-way clutches having input and output members, the input member of said first-gear position one-way clutch being coupled to a driven gear of said gear train for the first gear position, the output member of said first-gear position one-way clutch being coupled to the input member of said second-gear-position one-way clutch and a driven gear of the gear train for the second gear position, the output member of said second-gear-position one-way clutch being coupled to said output shaft, said engine-brake clutch being capable of selectively engaging said disengaging the input member of said first-gear-position one-way clutch and the output member of said second-gear-position one-way clutch, the arrangement being such that when one of said two solenoid valves fails and is inactivated the other solenoid valve is used to cause said engine-brake clutch control valve to engage said engine-brake clutch.

3. An apparatus according to claim 1, wherein said engine-brake clutch timing control valve is controlled such that said engine-brake clutch is disengaged only when one of said two solenoid valves is inactivated and the other solenoid valve is activated, and is engaged otherwise.

4. An apparatus for controlling shifting operation of a transmission having a plurality of power transmitting paths having different speed reduction ratios, a shift control valve assembly for selecting one, at a time, of said power transmitting paths, two solenoid valves for controlling said shift control valve assembly, and a manual valve for selecting a desired one of a plurality of ranges in response to operation by a driver, said apparatus comprising:
first means for allowing shifts to be made between all or selected ones of said power transmitting paths in the respective ranges;
each of said power transmitting paths being selected in response to a combination of on-off switching of said two solenoid valves;
said power transmitting paths in the respective ranges being set up depending on combinations of activation and inactivation of said two solenoid valves; and
second means for setting upon one of said power transmitting paths within the range selected by the manual valve which has the smallest speed reduction ratio within said selected range when both of said solenoid valves fail and are inactivated.

5. An apparatus according to claim 4, wherein said power transmitting paths comprise gear trains for first, second, third, and fourth gear positions, said ranges including D-, 3-, 2-, and 1-ranges, said second means comprising means for setting up the gear train for the fourth gear position when said D-range is selected, the gear train for the third gear position when said 3-range is selected, and the gear train for the second gear position when said 2- or 1-range is selected, in the event that both said solenoid valves fail and are inactivated.

6. An apparatus for controlling shifting operation of a transmission for selecting one, at a time, of a plurality of power transmitting paths having different speed reduction ratios, the power transmitting paths including at least one power transmitting path which has a one-way clutch for transmitting power only in a driving direction and an engine-brake clutch for locking said one-way clutch, said apparatus comprising:
each of at least two power transmitting paths having a separate one-way clutch for transmitting power only in a driving direction;
an engine-brake clutch for bypassing each said one-way clutch;
means for generating first control hydraulic pressure for selecting one, at a time, of the power transmitting paths;
a control solenoid valve for generating second control hydraulic pressure different from said first control hydraulic pressure; and
means for controlling said engine-brake clutch with the second control hydraulic pressure generated by said control solenoid valve.

7. An apparatus according to claim 6, wherein said control solenoid valve comprises a solenoid valve whose duty ratio is controllable.

8. An apparatus according to claim 6, wherein said control solenoid valve comprises a solenoid valve which can selectively be activated and inactivated.

9. A method of controlling shifting operation of a transmission for selecting one, at a time, of a plurality of power transmitting paths in the transmission having different speed reduction ratios, the power transmitting paths including at least one power transmitting path which has a one-way clutch for transmitting power only in a driving direction and an engine-brake clutch for bypassing said one-way clutch, said method comprising the steps of:
detecting the rotational speeds of input and output members of a shifting means for shifting into said one power transmitting path with the one-way clutch,
when a shift is to be made from any of said power transmitting paths to said one power transmitting path with the one-way clutch in which said engine-brake clutch is operable, disengaging said engine-brake clutch until the detected rotational speeds of the input and output members of said shifting means for shifting into said one power transmitting path with the one-way clutch are synchronized, after the shift has started; and
after said rotational speeds are synchronized, engaging said engine-brake clutch.

10. A method according to claim 9, wherein said transmission has a manual valve for setting up a plurality of ranges, and a shift lever for manually controlling said manual valve to make a shift between the ranges, further comprising the steps of:
when a shift is to be made from any of said power transmitting paths to said one power transmitting path with the one-way clutch in which said engine-brake clutch is operable, in response to manual operation of said shift lever, disengaging said engine-brake clutch until the rotational speeds of input and output members of shifting means for shifting said one power transmitting path with the one-way clutch are synchronized, after the shift has started; and after said rotational speeds are synchronized, engaging said engine-brake clutch.

11. A method according to claim 9, including the step of determining whether the input and output members of said shifting means are synchronized based on a ratio of the detected rotational speeds of the input and output members.

12. A method of controlling shifting operation of a transmission for selecting one, at a time, of a plurality of power transmitting paths in the transmission having different speed reduction ratios, the power transmitting paths including at least one power transmitting path which has a one-way clutch for transmitting power only in a driving direction and an engine-brake clutch for locking said one-way clutch, said method comprising the steps of:

when a shift is to be made from any of said power transmitting paths to said one power transmitting path with the one-way clutch in which said engine-brake clutch is operable, disengaging said engine-brake clutch for a predetermined period of time for allowing the rotational speeds of input and output members of a shifting means for shifting the said one power transmitting path with the one-way clutch to become synchronized, after the shift has started; and after said rotational speeds are synchronized, engaging said engine-brake clutch.

13. A method according to claim 12, wherein said transmission has a manual valve for setting up a plurality of ranges, and a shift lever for manually controlling said manual valve to make a shift between the ranges, further comprising the steps of:

when a shift is to be made from any of said power transmitting paths to said one power transmitting path with the one-way clutch in which said engine-brake clutch is operable, in response to manual operation of said shift lever, disengaging said engine-brake clutch until the rotational speeds of input and output members of shifting means for shifting said one power transmitting path with the one-way clutch are synchronized, after the shift has started; and after said rotational speeds are synchronized, engaging said engine-brake clutch.

* * * * *

Disclaimer 5,193,417 — Tsunefumi Niiyama, Noboru Sekine, both of Saitama; Takamichi Shimada, Tokyo; Hiroyuki Shimada, Saitama; Kaoru Kajikawa, Tokyo, all of Japan. TRANSMISSION WITH ONE-WAY CLUTCHES AND FAILSAFE METHOD OF AND APPARATUS FOR CONTROLLING THE TRANSMISSION. Patent dated March 16, 1993. Disclaimer filed July 30, 1996, by the assignee, Honda Giken Kogyo Kabushiki Kaisha.

Hereby enters this disclaimer to claims 12 and 13 of said patent.

*(Official Gazette,* April 29, 1997)